May 15, 1962 — W. P. FRANKENSTEIN — 3,034,697

CARTONS

Filed Jan. 5, 1955 — 10 Sheets-Sheet 1

INVENTOR.
WILLIAM P. FRANKENSTEIN,
BY Joseph A. Rave
Attorney

May 15, 1962 W. P. FRANKENSTEIN 3,034,697
CARTONS
Filed Jan. 5, 1955 10 Sheets-Sheet 2

INVENTOR.
WILLIAM P. FRANKENSTEIN
BY
Joseph A. Rave
Attorney

May 15, 1962 W. P. FRANKENSTEIN 3,034,697
CARTONS

Filed Jan. 5, 1955 10 Sheets-Sheet 3

INVENTOR.
WILLIAM P. FRANKENSTEIN
BY
Joseph A. Rave
Attorney

May 15, 1962 W. P. FRANKENSTEIN 3,034,697
CARTONS

Filed Jan. 5, 1955 10 Sheets-Sheet 4

INVENTOR.
WILLIAM P. FRANKENSTEIN
BY
Joseph A. Rave
Attorney

May 15, 1962 W. P. FRANKENSTEIN 3,034,697
CARTONS

Filed Jan. 5, 1955 10 Sheets-Sheet 8

INVENTOR.
WILLIAM P. FRANKENSTEIN
BY
Joseph A. Rave
Attorney

Fig. 26.

May 15, 1962 W. P. FRANKENSTEIN 3,034,697
CARTONS

Filed Jan. 5, 1955 10 Sheets-Sheet 10

INVENTOR.
WILLIAM P. FRANKENSTEIN
BY
Joseph A. Rave
Attorney

United States Patent Office 3,034,697
Patented May 15, 1962

3,034,697
CARTONS
William P. Frankenstein, 7260 Eastlawn Drive,
Cincinnati, Ohio
Filed Jan. 5, 1955, Ser. No. 479,952
4 Claims. (Cl. 229—31)

This invention relates to improvements in boxes or cartons and particularly to such boxes or cartons of the knocked-down variety which are formed from a single blank.

In any foldable knocked-down box or carton one of the chief aims is to easily and readily erect the same from the knocked-down blank and be able to safely lock the walls in their erected position.

A further important consideration in boxes or cartons of this kind is the provision of the wall locking means that can be readily and quickly effected.

Another important consideration in knocked-down boxes or cartons is the fact that said boxes or cartons may be erected automatically on erecting machines so that they may be readily filled or packed with merchandise and subsequently wrapped with transparent material.

The box or carton herein disclosed meets all of these desirable features.

The principal object of the present invention is, therefore, the provision of a knocked-down box or carton formed of a single blank wherein the walls of the blank or carton may be readily assembled and locked in their erected or assembled positions.

Another object of this invention is the provision of a blank whereby the foregoing object may be readily accomplished.

A futher object of this invention is the provision of a box or carton which is provided with at least one wall of appreciable width having means for locking the same in definite and positive relation with the adjacent walls.

A still further object of this invention is the provision of a locking means or tab from the top wall member of one of the box walls that embraces and locks the remaining walls of the carton in their final erected positions.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 23 is a perspective view of an erected carton set up from the blank of FIG. 22.

Throughout the several views of the drawings similar reference characters are employed to denote the same or similar parts.

There is disclosed, as noted above, several modifications of a box or carton each embodying the principals and improvements of the present invention.

Figure 1:
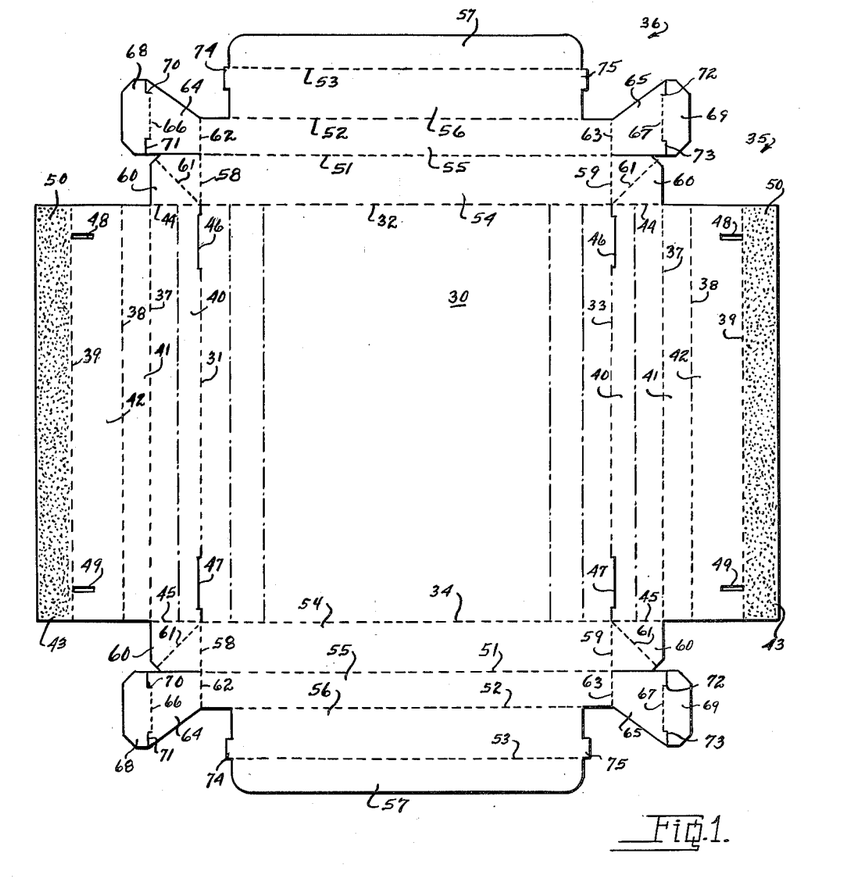
FIG. 1 is an extended plan view of one form of the invention and from which a carton or box may be erected with the walls at two ends thereof embracing and locking all four walls in erected positions.

Each modification will be described in succession but only insofar as it distinguishes from the basic construction as illustrated in FIG. 1.

Specifically, the blank and carton illustrated in FIGS. 1 to 6 comprises a single blank substantially rectangular in overall dimensions having a main or central panel 30, which in the erected carton or box forms its bottom or back having its edges defined by score or fold lines 31, 32, 33 and 34. For purposes of description the score or fold lines 31 and 33 may be designated as the side edges of the panel 30 and respectively integrally, hingedly, connected with the main or bottom panel, a substantially identical extension 35, which, as will later be made clear, are erected to provide the carton or box side walls. Similarly the score or fold lines 32 and 34 may be designated as end edges of the panel 30 and respectively integrally, hingedly, connect with the main or bottom panel 30 a similar extension 36 which, in the erected carton, from the end walls.

Since the extensions 35 are substantially identical with one another, it is deemed sufficient if but one of them be described for the other. Accordingly, the extension 35 between its score or hinge line 33 and its outer end is provided with a plurality of parallel score or fold lines 37, 38 and 39 forming in the extension panels 40, 41, 42 and 43. The panel 40 has its ends defined by score or fold lines 44 and 45 and in the erected carton the said panel forms the side wall outer wall member. The panels 41, 42 and 43 have their ends in line with the score or fold lines 44 and 45, which in turn are in alignment with the main or bottom panel end scores 32 and 34, with said panels 41, 42 and 43 respectively forming the side wall top wall member, the side wall inner wall member, and the side wall inner wall member glue flap.

The extension 35 is provided along the hinge or score line 33 just inwardly of the main or bottom panel ends 32 and 34 with slits or cuts 46 and 47 which constitute part of the walls locking mechanism as will presently be made clear. The panel 42, or inner wall member, is provided inwardly of its ends with slits 48 and 49 again for the purpose of locking the walls in their erected positions, as will subsequently be made clear.

The glue flap or panel 43 is provided with adhesive 50 whereby it is permanently secured to the main or bottom panel 30 for securing the side wall inner wall member in its operative position.

Again, end wall forming extensions 36, being substantially identical, it is deemed sufficient if but one of them be described for both. Accordingly, the said end wall extension, between its connecting score or fold line 34 and the outer end thereof, is provided with score or fold lines 51, 52 and 53, thereby forming in said end wall extension panels 54, 55, 56 and 57. In the erected carton the panel 54 forms the end wall outer wall member and has its ends defined by score or fold lines 58 and 59. The score or fold lines 58 and 59 are in alignment with the main or bottom panel side edges score or fold lines 31 and 33 and respectively integrally hingedly connect with each end of the said panel 54 a tucking flap 60. The tucking flap 60 is integrally, hingedly, connected with the adjacent end of side wall outer wall member or panel 40 through its end scores, for example, end score 45. The tucking flap 60, therefore, constitutes a bellows corner and is provided with a diagonal score or fold line 61 whereby it may be folded on itself accordian-wise.

In the end wall extension 36, the panel 55 forms an end wall top wall member and has its ends defined by score or fold lines 62 and 63 which respectively integrally hingedly connect with said panel 55 locking flaps 64 and 65. As illustrated, the said locking flaps 64 and 65 are outwardly flaired, whereby their outer ends are of greater width than the end attached to the panel 55. Each of said locking flaps 64 and 65 is provided at its outer end with a score or fold line 66 or 67 through which there is integrally hingedly connected a locking lug 68 or 69. The score or fold lines 66 and 67 are not the full width of the locking flaps but connect offset cuts at its opposite ends, whereby shoulders 70 and 71 are formed at the ends of the score or fold line 66 in the tab 64 while similar shoulders 72 and 73 are formed at the ends of the score or fold line 67 in the locking tab 65. The operation of the locking tabs and their cooperation with the side wall slits 46 and 47 will be subsequently described.

The panel 56, in the end wall extension 36, constitutes or forms the end wall inner wall member and has projecting from its outer corners locking lugs 74 and 75 which cooperate with the side walls inner wall members locking slits 48 and 49. The remaining panel 57 in the end wall extension 36 constitutes or forms a spacer panel for the end walls for spacing the lower ends of the inner and outer wall members from one another.

The blank after being cut and scored as above set forth, has the adhesive 50 applied to the upper surface of its glue flaps 43, as seen in FIG. 1, whereupon the side wall extensions 35 are inwardly folded on their score or fold lines 37 thereby superimposing panels 41, 42 and 43 on the side wall panels 40 and main or bottom panel 30 and adhesively securing the glue flaps 43 to said bottom panel 30 as illustrated in phantom lines for each of said side wall extensions. The blank is now in its fully knocked-down position as illustrated in cross section in FIG. 2 and it is in this position that the said knocked-down blank is shipped to the user.

Figure 5:
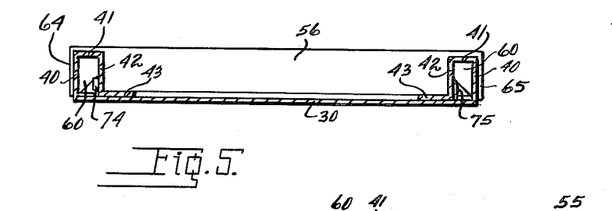
FIG. 5 is a transverse sectional view through the carton of FIG. 3 as seen from line 5—5 on said FIG. 3.
Figure 6:
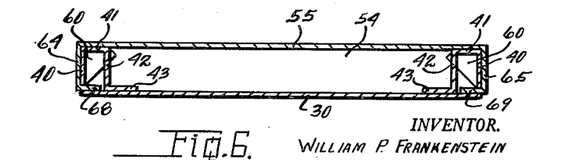
FIG. 6 is a transverse sectional view, similar to FIG. 5, taken longitudinally through one of the walls as seen from line 6—6 on FIG. 3.

The user on desiring to set up the box or carton does so by first raising the side walls from their extended knocked-down positions to the position to have the side walls inner and outer wall members normal to the bottom or main panel and with their respective top wall members parallel with said main or bottom panel, as clearly illustrated in FIG. 5.

The end walls are then erected by first raising one end wall extension 36 on its score or fold line, score or fold line 32, for example. This raising of the end wall extension automatically inwardly folds the tucking or bellows corner flaps 60 on their score or fold lines 61 to lie inwardly of the end wall outer wall member and adjacent ends of the set up or erected side walls. The remaining end wall panels 55, 56 and 57 are then folded to be normal or at right angles to one another which disposes the end wall panel or top wall member 55 on the side wall top wall members, the panel or inner wall member 56 downwardly of the panel 55 and the spacer panel 57 on the main or bottom panel 30 and between the lower ends of the end walls inner and outer wall members. In positioning said inner wall member or panel 56 to its final or desired position, the locking lugs 74 and 75 thereof were inserted in the locking slits or slots 48 in the adjacent ends of the side wall inner wall members or panels 42. The locking flaps 64 and 65 are now down-turned to be exteriorly of the ends of the side walls outer wall members 40, whereupon the locking lugs 68 and 69 are bent to be normal to the said locking flaps and are inserted into the slits 46 inwardly of the ends of the side score fold lines 31 and 33.

It will be appreciated that upon the raising of the side walls from their knocked-down positions in FIG. 1 to their upstanding positions in FIG. 5 the locking slits 46 and 47 open to provide, in effect, slots receiving the locking lugs 69. After the insertion of said locking lugs the shoulders 70—73 engage behind the ends of the said slots to resist and prevent inadvertant withdrawal of said locking lugs from the locking slits.

Figure 3:
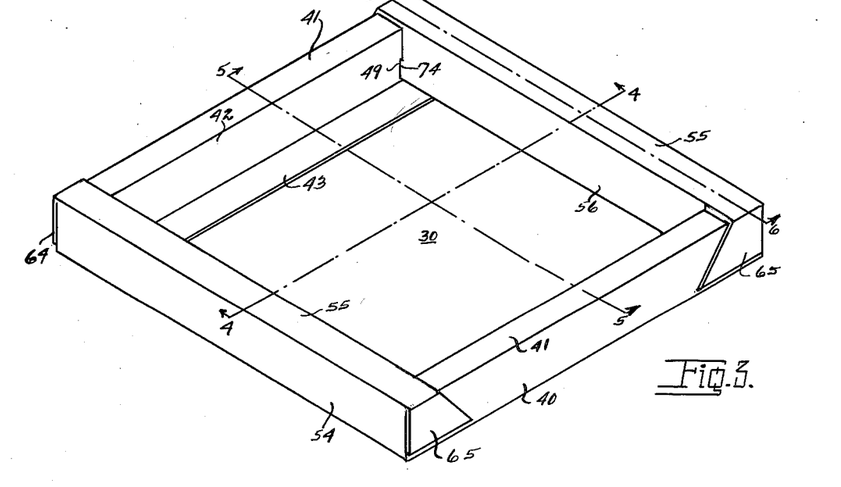
FIG. 3 is a perspective view of an erected carton formed from the blank of FIG. 1.

Upon erection of one end wall the other end wall is similarly erected with the erected carton of FIG. 3 as the result.

Figure 4:
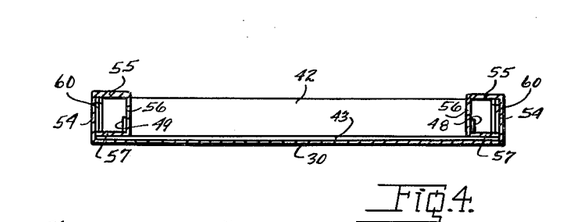
FIG. 4 is a longitudinal sectional view through the erected carton as seen from line 4—4 on FIG. 3.

It will be noted from the foregoing and from FIGS. 4 and 5 that the carton has each of its walls of a hollow construction, namely, of spaced apart inner and outer wall members. It will be further noted that the end walls have the inner end wall members suitably and firmly locked in an upright position and at the same time the end wall top wall members embraces and firmly locks the side walls in their erected positions.

It should further be noted that each of the other modifications in this application are embraced by the elements in this basic blank and carton with said modification primarily consisting in variations in the cross section of the walls in that they may be of double thickness, or single thickness or of a single thickness outer wall member and a single thickness top wall member.

Figure 7:
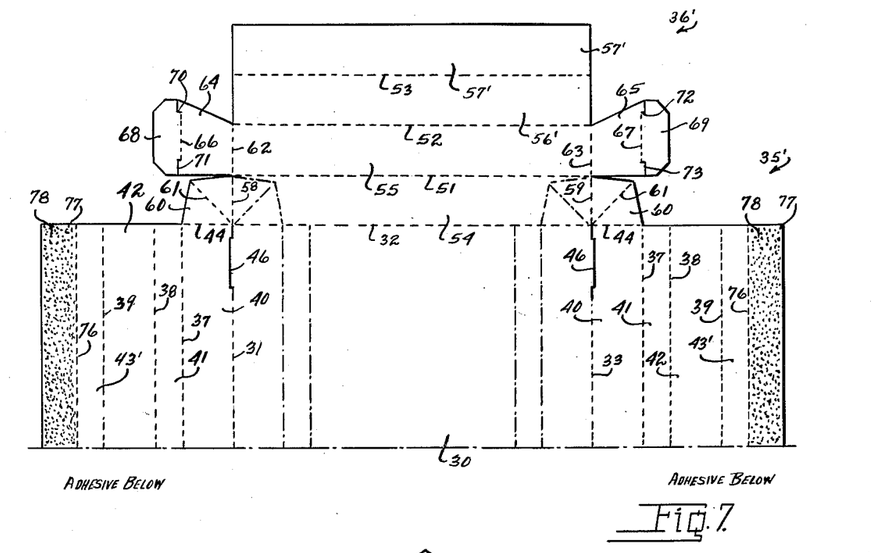
FIG. 7 is an extended plan view of a half blank showing certain modifications over the blank of FIG. 1.
Figures 8, 9:
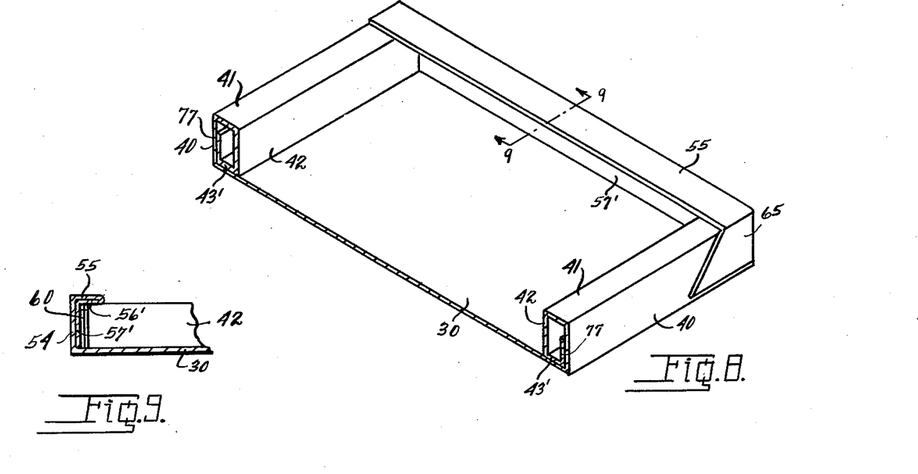
FIG. 8 is a sectional-perspective view of an erected carton from the blank as illustrated in FIG. 7.
FIG. 9 is a sectional view through one wall of the erected carton of FIG. 8 as seen from line 9—9 on said FIG. 8.

The modification illustrated in FIGS. 7, 8 and 9 produces a carton which in effect has side walls of tubular construction and end walls of a double thickness outer wall member and a double thickness top wall member with no end wall inner wall member.

This modification of the blank as disclosed in FIG. 7 consists in forming panel 43' as a bottom wall member to which is hingedly connected through a score or fold line 76 a glue flap or panel 77.

The said modification of the blank of FIG. 7 further consists in modifying end wall extension 36' by forming the end wall inner wall member or panel 56' as an inner top wall member and forming the panel 57' as the end wall inner wall member which is in face contact with the end wall outer wall member or panel 54.

The blank of FIG. 7 is symmetrical, that is, the other end or half of the blank is identical with that illustrated, and after the blank is cut and scored as illustrated in said FIG. 7 the glue flaps or panels 77 have adhesive 78 applied to their under surfaces as illustrated in FIG. 7 for the half blank there shown. The said side wall extensions 35' are then each, respectively, folded on its score or fold line 38 for thereby super-imposing panels 43' and 78 on the panels or side wall outer wall members 42 whereupon the said side wall extensions are further inwardly folded on the score or fold lines 37 to the positions illustrated in FIG. 7 which adhesively secures the glue flaps 77 to the inner surfaces of the side walls outer wall members or panels 40. It is in this position that the knocked-down blank of FIG. 7 is shipped to the user.

The user upon desiring to erect the box or carton from the knocked-down blank follows substantially the same steps as above outlined, except, that the side walls may be first opened up to their tubular form which would result in the side walls outer wall members remaining in their extended positions, as illustrated in FIG. 7, and with the top and bottom wall members upstanding from said outer wall member and with the inner wall member parallel with said outer wall member, whereupon said side walls in their present tubular condition would be folded on their hinge connections, or score or fold lines 31 and 33, with the bottom panel to upstand therefrom, as illustrated in FIG. 8.

The end walls would now be individually erected by folding the panels 56' and 57' on the score or fold line 52 and onto the panels 54 and 55, whereupon the said end wall extension would be raised on the main or bottom panel end score, 32, for example, which would automatically inwardly fold the bellows corner pieces on themselves to be against the ends of the erected side walls. The end wall panels at this time have the score or fold lines 51 and 53 super-imposed on one another, whereupon, the panels 55 and 56' are folded, as a unit onto the adjacent ends of the side walls top wall members and the tucking flaps 64 and 65 positioned as above set forth for locking the parts in their operative positions.

The modification in FIGS. 10 to 13, inclusive, has the same side walls as the modification in FIG. 7 but may have the side walls as illustrated in FIG. 1. In this modification the end wall, however, has a single thickness outer wall member and a single thickness top wall member. The outer edge of this end wall extension, 36'', is illustrated as contoured, namely, as provided with diamond shaped teeth 79 whereby upon erection the inner longitudinal edge of said end wall, is provided with an artistic finish. It is to be understood that this edge may take any suitable or desirable contour, that illustrated in the drawings being by way of example only.

Figure 10:
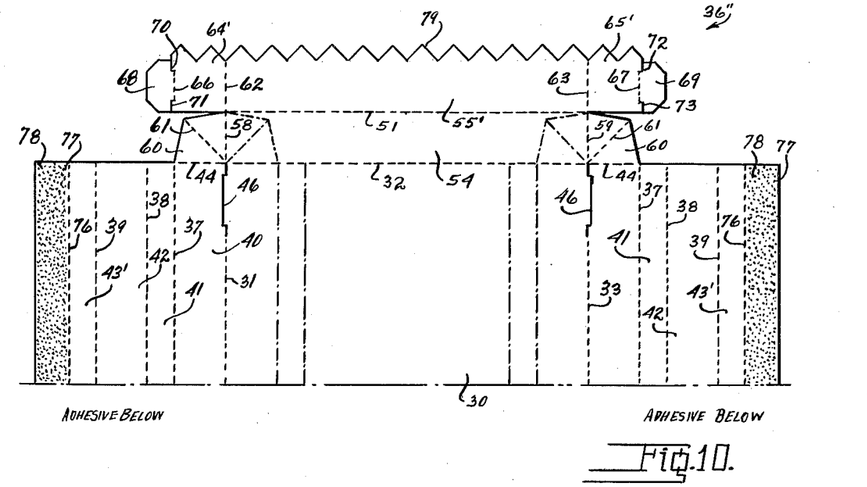
FIG. 10 is an extended plan view of a half blank, similar to FIG. 7, showing a modification in the blank of FIG. 7.
Figures 11, 12:
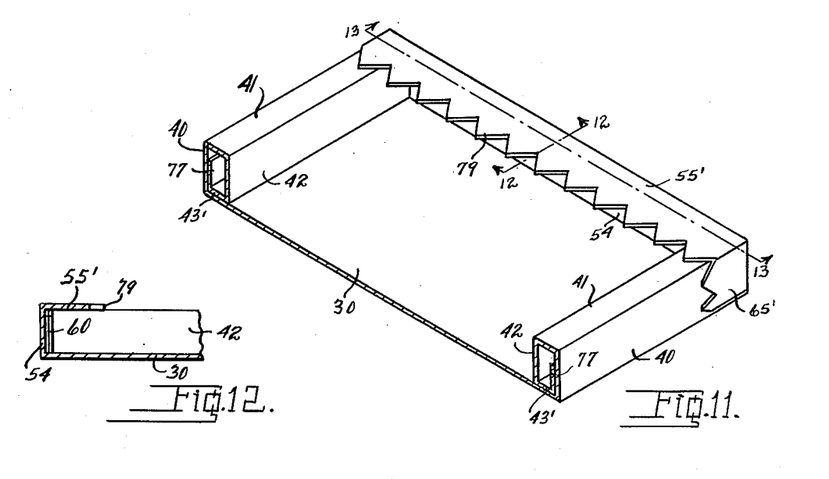
FIG. 11 is an erected sectional-perspective view of an erected carton from the one-half blank of FIG. 10.
FIG. 12 is a transverse sectional view through one wall of the erected carton as seen from line 12—12 on FIG. 11.
Figure 13:
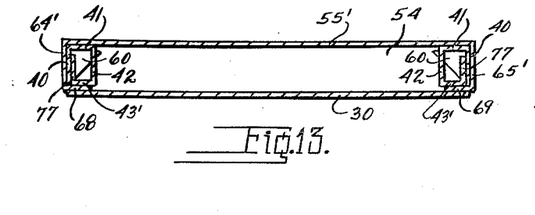
FIG. 13 is a longitudinal sectional view through the one wall illustrated in FIG. 12 disclosing the locking of the walls in operative position as seen from line 13—13 on FIG. 11.

The end wall top wall member in the modification in FIG. 10 is identified by the reference numeral 55' and which has the locking flaps 64' and 65' illustrated as continuations of the said end wall top wall member or panel 55', so that the contoured edge of the said end wall top wall member is continued down the sides of the erected carton, as illustrated in FIG. 11. These locking flaps 64' and 65' have, however, integrally hingedly connected therewith, through their respective score or fold lines 66 and 67, the locking lugs 68 and 69 which cooperate with the locking slits 46 of the side wall extensions in the same manner as above set forth.

It is believed obvious that the blank of FIG. 10 is erected in the same manner as the blank of FIG. 7 and provides a box or carton substantially identical with that illustrated in FIG. 8, except that the inner edges of the end walls top wall members are contoured for providing an artistic effect to the said carton, and the goods eventually disposed or packed therein.

Figure 14:
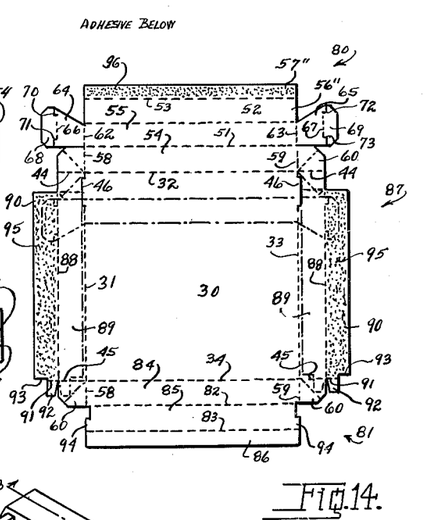
FIG. 14 is an extended plan view of a blank disclosing modifications therein embodying the principals of the present invention, but in which walls of a different cross section are obtained than disclosed in the preceding figures.

In the species of the invention above described the side walls were of hollow wall construction and the end walls, each were either of hollow wall construction or included only a top wall member of a width that gave the impression of considerable depth or thickness. The modification illustrated in FIGS. 14 to 18, inclusive, has an end wall of hollow wall construction while the remaining end wall and the side walls are of double thickness. In the blank of FIG. 14 the end wall flap is substantially identical with that illustrated in FIG. 1 except that the said end wall instead of being folded from a fully extended position has the said end wall formed as a knocked-down wall with its inner wall member secured to the carton main or bottom panel.

Accordingly, the end wall extension 80 is provided with longitudinally extending score or fold lines 51, 52 and 53, thereby providing in said extension a panel or end wall outer wall member 54, a panel or outer wall top wall member 55, a panel or inner wall member 56'' and a panel or glue flap 57''. The said panels 56'' and 57'' differ from the corresponding panels 56 and 57 in FIG. 1 in that they are of the same length as the panels 54 and 55. The panel or top wall member 55 in the end wall extension 80 has integrally hingedly connected therewith through its end fold or score lines 62 and 63, locking flaps 64 and 65 each of which in turn has integrally hingedly connected therewith the locking lugs 68 and 69.

The opposite end wall extension 81 is dissimilar to the extension 80, of FIG. 14, and the corresponding extension in FIG. 1, and is provided longitudinally thereof with score or fold lines 82 and 83 which provide in said extension 81 a panel or outer wall member 84, a panel or inner wall member 85, and a creeper flap 86. The panel or end wall outer wall member 84 has its ends defined by the score or fold lines 58 and 59, similar to the other end wall outer wall member or panel 54, and through which bellows corner pieces or tucking flaps 60 are integrally hingedly connected with the said panel 84.

The side walls extensions 87, in the blank of FIG. 14 are each, respectively, provided substantially centrally thereof with a score or fold line 88 thereby providing in each of said extensions, panels 89 and 90, which respectively, form side wall inner and outer wall members. The panels 89, respectively, similar to the side wall panel or outer wall member of FIG. 1, each has its ends defined by score or fold lines 44 and 45 and through which the bellows corner pieces 60 are integrally hingedly connected therewith. Each of the panels or inner wall members 90, of the blank of FIG. 14, has one end cut back from the end thereof to accommodate the hollow end wall adjacent thereto and has its other end defined in part by a score or fold line 91 which integrally hingedly connects therewith a tucking and locking flap 92. The remaining portion of the said end of the panels 90 are cut back as at 93 to provide a locking shoulder behind which locking lugs 94 at the outer corners of the end wall inner wall member or panel 85 engage in erecting the carton.

Each of the panels 90 is provided on the upper surface, as illustrated in FIG. 14, which adhesive 95 and through which said panels are permanently attached to the inner surface of the side wall panels or outer wall members 89. The glue flap 57″ of the end wall extension 80 has adhesive 96 applied to its under surface as seen and indicated in FIG. 14.

After the blank has been cut and scored as illustrated in FIG. 14 the said extension is folded on the score on fold line 52 for thereby super-imposing panels 56″ and 57″ on the panels 54 and 55 and thereby exposing the adhesive 96. The blank is then folded on the score or fold line 32 for bringing the adhesive 96 into operative engagement with the upper surface of the main or bottom panel 30 as illustrated in phantom lines in FIG. 14. It is to be noted that prior to the final folding of the extension 80 the side walls extensions 87 each had its panel or inner wall member 90 folded onto the panel or inner wall member 89 and thereby through the adhesive 95 securing these parts to one another, and which positions of the panels is illustrated in phantom lines in FIG. 14.

It is in this condition of the blank that it is shipped to the user for subsequent erection.

Figure 15:
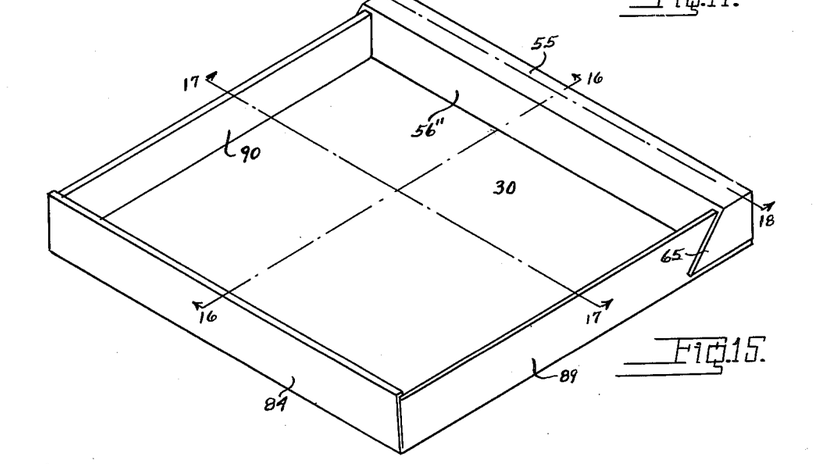
FIG. 15 is a perspective view of an erected carton from the blank of FIG. 14, said FIG. 15 being drawn to an enlarged scale from that of FIG. 14.
Figure 16:
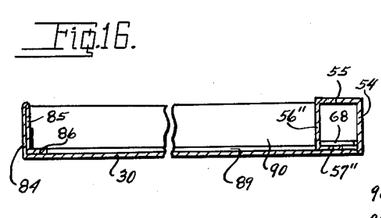
FIG. 16 is a longitudinal fragmentary sectional view through the erected carton as seen from line 16—16 on FIG. 15.
Figure 17:
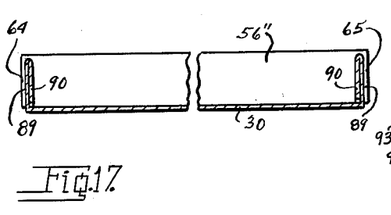
FIG. 17 is a fragmentary transverse sectional view through the erected carton of FIG. 15 as seen from line 17—17 on said FIG. 15
Figure 18:
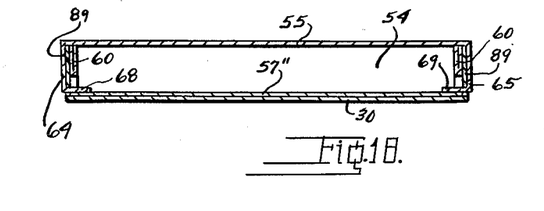
FIG. 18 is a longitudinal sectional view through an end wall of the carton as seen from line 18—18 on FIG. 15.

The user in erecting the carton from the knocked-down blank to the erected carton of FIG. 15 follows substantially the same steps as above set forth and which briefly are as follows:

The knocked-down end wall of end wall extension 80 is raised from its knocked-down position to the position illustrated in FIG. 16 whereupon the side walls are raised to be normal to the main or bottom panel or to the position illustrated in FIG. 17. The locking flaps 64 and 65 are now folded downwardly exteriorly of the adjacent ends of the side walls whereupon the locking lugs 68 and 69 are inserted through the locking slits at the bottom of the side walls, all as above fully set forth. The remaining end wall formed from end wall extension 81 is now raised from its extended position to have the outer wall member or panel 84 normal to the main or bottom panel 30 and which positioning automatically folded the bellows corners 60 on themselves against the ends of the inner wall members, and which bellows corners folding carried with them the tucking flaps 92 of the side walls inner wall members. The end wall inner wall member or panel 85 is now folded to be interiorly of end wall outer wall member or panel 84 and the creeper flap 86 disposed on the said main or bottom panel and with the locking lugs 94 of said inner wall member or panel 85 disposed behind the side walls inner wall members of shoulders 93 as illustrated clearly in FIG. 16.

From the foregoing, it will be noted that substantially the same locking means is provided for locking a hollow wall in operative position whether the side walls are of a similar hollow wall construction or of the conventional double thickness construction.

Figure 19:
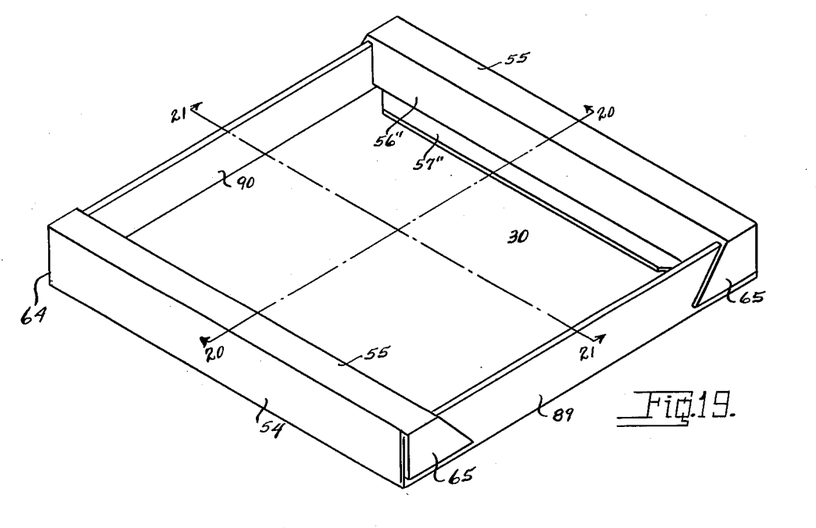
FIG. 19 is a perspective view of an erected carton similar to FIG. 15 but formed from a modified blank.
Figure 20:
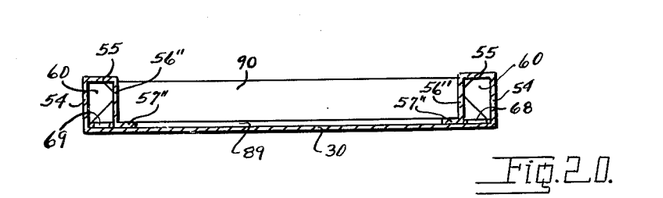
FIG. 20 is a longitudinal sectional view through the erected carton of FIG. 19 as seen from line 20—20 on said FIG. 19.
Figure 21:
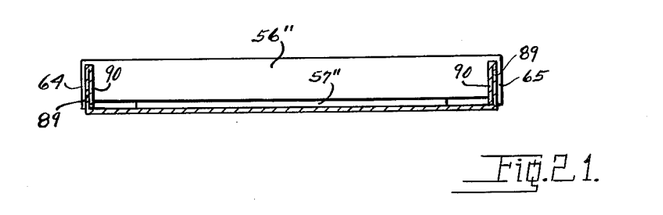
FIG. 21 is a transverse sectional view through the erected carton of FIG. 19 as seen from line 21—21 on said FIG. 19.

The modification illustrated in FIGS. 19, 20 and 21 is quite similar to that in FIGS. 14 to 18 inclusive, except that both of the end walls are of hollow wall construction, that is, with spaced apart inner and outer wall members and a top wall between them. In the formation of the knocked-down blank from which the erected carton of FIG. 19 results, a slight modification is made, to the extent that the glue flap 57″ has the adhesive 96 applied thereto on the upper surface thereof as disclosed in FIG. 14, and said blank is given but a single fold to its knocked-down position, merely, the blank extension 80 is folded only on the score or fold line 51 for properly positioning and securing the glue flap to the main or bottom panel 30. By this construction the said glue flap 57″, for each end wall, projects inwardly of the carton ends, toward its center, as illustrated in FIG. 20 instead of outwardly, or away from the carton center, as illustrated in FIG. 16.

The foregoing modifications of the invention are for open end boxes or cartons, wherein the side and end walls are of substantially the same height from the main or bottom panel. The modifications disclosed in FIGS. 22 to 29, inclusive, while embodying substantially the same elements, per se, as the foregoing modifications are in effect display containers of an artistic nature as distinguished from a mere enclosing box or carton.

Figure 22:
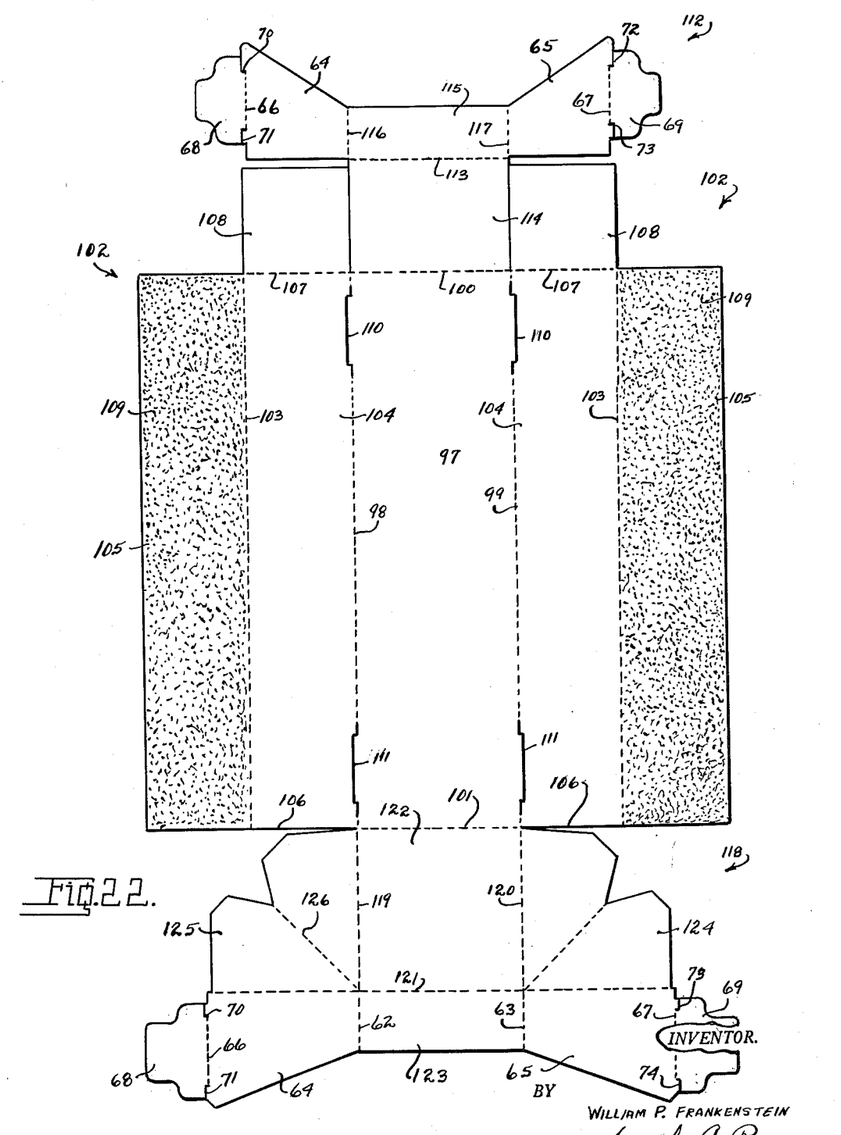
FIG. 22 is an extended plan view of a modified blank embodying the principals of the present invention and disclosing modification over the blanks of FIG. 1.
Figure 24:
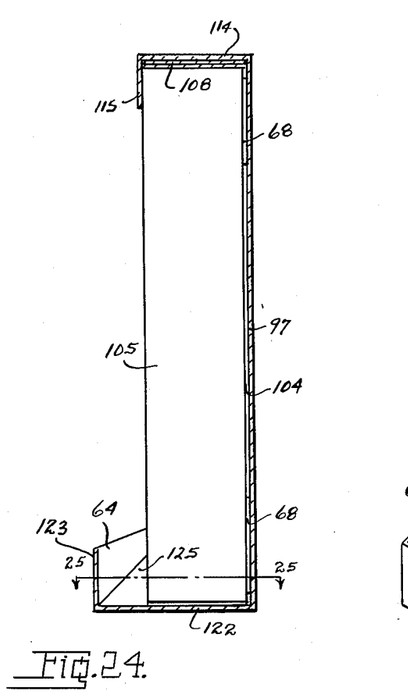
FIG. 24 is a vertical sectional view through the erected carton of FIG. 23.
Figure 25:
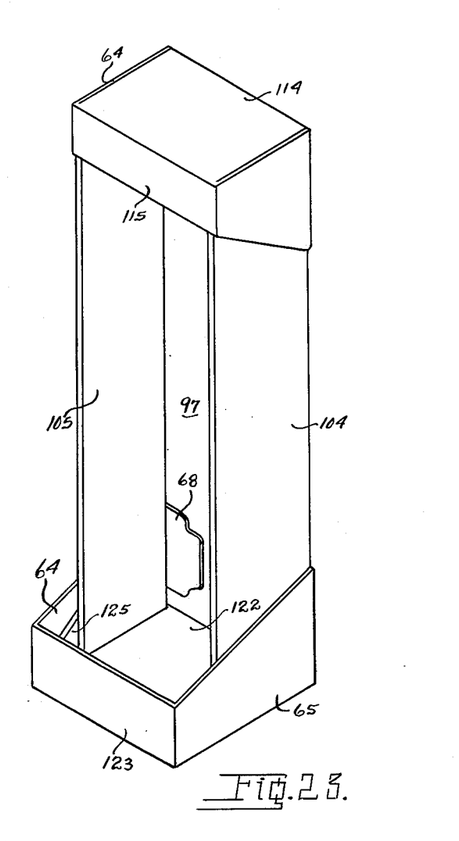
FIG. 25 is a horizontal sectional view through one end of the erected carton as seen from line 25—25 on FIG. 24.

The blank, as disclosed in FIG. 22, therefore, comprises a main panel 97 which actually forms the back of the display container and has its vertical side edges defined by score or fold lines 98 and 99 with its top and bottom edges defined by score or fold lines 100 and 101. The side edges score or fold lines 98 and 99, respectively, integrally, hingedly connect with the said main or back panel 97 a similar extension 102 which is provided substantially centrally and longitudinally thereof with a score or fold line 103 thereby providing in each extension a pair of panels 104 and 105. The panel 104 in the erected display container constitutes or forms a side wall outer wall member and has its lower end as a cut line 106 in alignment with the main panel bottom edge score or fold line 101. The other end of the panel 104 is defined by a score or fold line 107 in alignment with the main panel top score or fold line 100. The score or fold line 107 integrally, hingedly connects with the panel 104 a tucking flap 108. In the erected display container the panel 105 of the extension 102 forms the side wall inner wall member and is adapted to be secured to the inner surface of the panel 104 by adhesive 109 carried by the panel 105.

The side edge score or fold lines 98 and 99 are each provided with slits 110 and 111 which are slightly offset from the said score or fold lines into the side wall outer wall members or panels 104.

The main or back panel 97 through the top edge score or fold line 100 has integrally hingedly connected therewith an extension 112 which in the erected display container forms a top therefor. The said extension 112 is provided longitudinally thereof with a score or fold line 113 thereby providing in the said extension a pair of panels 114 and 115. The panel 114 in the erected container constitutes the carton top wall and is of a width substantially equal to the width of the main or back panel 97, and in the erected container is of a heighth substantially equal to the heighth of the side walls outer wall members or panels 104. The top wall extension panel 115 has its ends defined by score or fold lines 116 and 117 which integrally, hingedly, connect with the ends of the said panel 115 the locking flaps and locking lugs 64, 65, 67 and 68, which are substantially identical with the corresponding locking flaps and lugs as above described. In the erected container the panel 115 forms a depending front of a depth or length, in the direction of extent of the container heighth, equal to its width.

The main or back panel 97 through its bottom edge score or fold line integrally, hingedly, connects therewith an extension 118 which in the erected container constitutes the bottom therefor. The said extension 118 is provided longitudinally thereof with score or fold lines 119 and 120 together with a transverse score or fold line 121 thereby forming, downwardly of the main or back panel 97, as seen in FIG. 22, adjacent panels 122 and 123. The panel 122 is of the same width as the main or back panel 122 but is of greater heighth than the side walls inner wall members, panels 104, wherefore, and as will presently be made clear, the display container has a bottom that projects outwardly of the side and top edges.

The bottom forming extension 118 through the score or fold lines 119 and 120 hingedly connect with the panels 122 and 123 lateral flaps, the portion of which that is located above the score or fold line 121 and to the right of the score or fold line 120 constituting or forming a bellows corner 124, while the similar portion located above the score or fold line 121 and to the left of the score or fold line 119 forming an opposite bellows corner 125. Each of the bellows corners 124 and 125 is provided with a diagonal score or fold line 126 whereby they are folded, respectively, on themselves upon erection.

The portions of the bottom extension 118 below the said bellows corners 124 and 125 respectively form locking flaps and locking lugs such as above set forth and indicated by the reference numerals 64, 65, 68 and 69.

After the blank has been cut and scored as illustrated in FIG. 22 and the adhesive 109 applied to the exposed surface of panels 105, again as illustrated in FIG. 22, the said panels 105 are folded on the score or fold lines 103 into face contact with the panels 104 for adhesively securing the said panels to one another. The blank is now in its knocked down position for shipment to the ultimate user.

Figure 2:
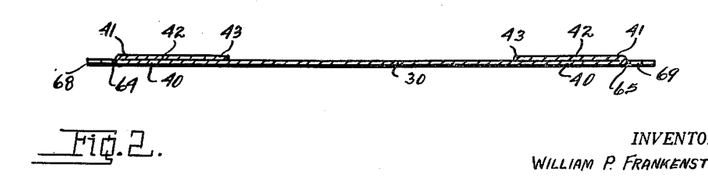
FIG. 2 is a transverse sectional view of a knocked-down blank in the condition in which it is shipped to a user.

The user upon desiring to set up the display container does so by following the steps above set forth for erection of a carton from the blanks of FIGS. 1 and 2, which, briefly, is as follows:

The user raises the side walls 105 to be normal to the main or back panel 97 whereupon the tucking flaps 108 are folded to be normal to the side walls and extend transversely of the said main or back panel 97 whereupon the top extension 112 is folded on its score or fold line 100 to be normal to the main or back panel 97. The panel 115 is then folded to be normal to the panel or container top 114 with its outer ends disposed on the adjacent upper ends of the side walls, so that the locking flaps 64 and 65 may be disposed downwardly exteriorly of the ends of the said side walls and the locking lugs 68 and 69 inserted within the locking slits 110.

The bottom extension 118 is now erected in the same manner as the top 112 with the bellows corners 124 and 125 folded on themselves and disposed beneath the locking flaps 64 and 65 so as to lie exteriorly of the lower ends of the container side walls and be held in operative position upon the insertion of the locking lugs 68 and 69 into their locking slits 111.

The resulting carton or container provides a display container for bottled goods, packaged goods, and the like, and, as clearly illustrated in FIG. 23, has a top and a bottom from which, respectively, extends a front flange and with the bottom projecting outwardly beyond the ends of the side walls. By this construction a display container, particularly for bottled goods, is provided wherein the body portion of the bottle is forwardly of the free ends of the side walls and with the neck and closure for the bottle disposed behind the top depending or front flange.

It will be noted, however, that the display container comprises substantially the same elements as a box or carton which rests on the central or main panel of the blank. It will further be noted that the said display container has its top bottom and side walls locked in operative positions the same as the carton side and end walls of the above described carton species.

The modification disclosed in FIGS. 26 to 29, inclusive, produces a display container similar to that in FIGS. 22 to 25, inclusive, except that the side walls are of hollow construction, that is, with the inner and outer wall members spaced from one another instead of in face and secured contact.

Figure 26:
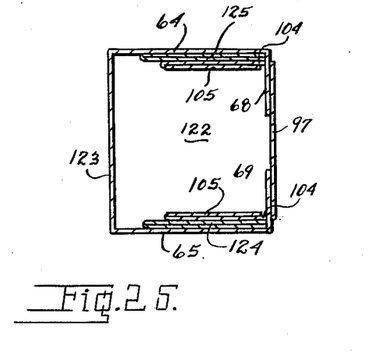
FIG. 26 is an extended plan view similar to FIG. 22 disclosing modifications in the blank and wherein the erected carton is provided with spaced apart walls.

Accordingly the blank in FIG. 26 in its side wall extensions 102' through the score or fold line 103 has integrally hingedly connected therewith a panel 126 which constitutes the side wall top wall member and in turn has integrally hingedly connected therewith through a score or fold line 127 a panel 128 which forms the side wall inner wall member. The panel or side wall inner wall member 128, in turn, through a score or fold line 129 has integrally hingedly connected therewith a panel 130 forming the side wall bottom wall member which through a score or fold line 131 carries a glue flap 132. The glue flap 132 has applied to its under surface as seen in FIG. 26, adhesive 133 through which it is attached to the inner surface of the side wall outer wall member 104, as above set forth in connection with the blank illustrated in FIG. 7.

Figure 27:
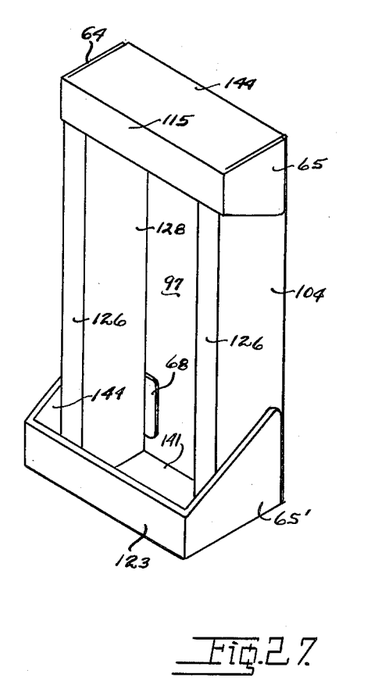
FIG. 27 is a perspective view of an erected carton erected or set up from the blank of FIG. 26.
Figure 28:
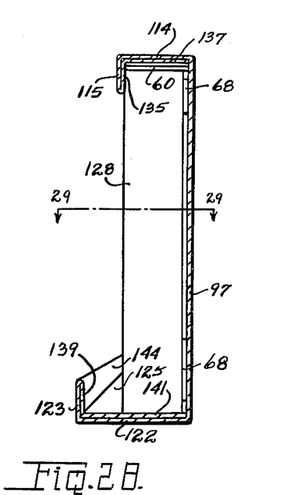
FIG. 28 is a vertical sectional view through the erected carton of FIG. 27.
Figure 29:
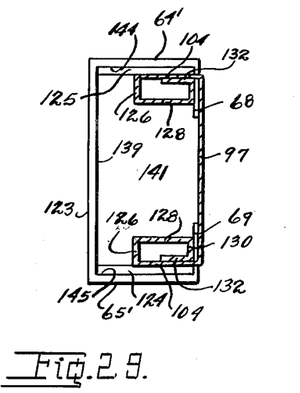
FIG. 29 is a transverse sectional view through one end of the erected carton of FIG. 26 as seen from line 29—29 on FIG. 28.

The display container of FIG. 27 is, in addition, provided with a double thickness top and depending top flange as well as a double thickness bottom and bottom front flange. In order to accomplish this the top extension 112' has its panel 115 connected, through a score or fold line 134, therewith a panel 135 which in the erected carton forms the top depending flange inner member. The panel 135 in addition through a score or fold line 136 has connected therewith a terminal panel 137 which lies, in the erected carton, against the inner or lower face of the container top 114 to form the container top inner member.

Similarly the bottom extension 118' has integrally hingedly connected with the panel 123, through a hinge or fold line 138, a panel 139 which forms the bottom front flange inner member. The panel 139, in turn, through the score or fold line 140 has integrally hingedly connected therewith a terminal panel 141 which forms the bottom inner member.

Each of the locking flaps 64' and 65' of the container bottom extension 118' is provided at its free end, lateral edge, with a score or fold line 142 and 143 through which there is integrally hingedly connected with said locking flaps, tucking flaps 144 and 145.

After the blank has been cut and scored as disclosed in FIG. 26 and the adhesive 133 applied to side walls gluing flaps 132 the said side wall extensions are folded on their score or fold lines 129 whereupon they are further folded on the score or fold lines 103 for thereby bringing the adhesive 133 into operative engagement with the inner surface of the panels 104.

The knocked-down blank is erected in the same manner that the blank of FIG. 22 was erected after first folding the top extension 102' on its score or fold line 134 for thereby super-imposing the score or fold line 136 on the score or fold line 113 and after first folding the bottom extension 118' on its score or fold line 138 for thereby again super-imposing the score or fold line 130 on the score or fold line 121.

The erection of the bottom extension 118' is further preceded by the in-folding of tucking flaps 144 and 145 onto the inner surfaces of the locking flaps 64' and 65'.

The erected carton or display container is thus provided with a finished edge at each edge that is exposed to view and at the same time provides a display container in which the top and bottom, as well as the top depending flange and bottom upstanding flange, is each of double thickness for strength and stability while the side walls are of hollow or spaced apart construction thereby again resulting in additional stability and strength.

From the foregoing, it will now be appreciated that there has been provided a box, carton, display container and the like formed from a single blank and which can be readily manually erected from the blank when in a knocked-down condition and in which the walls are readily and securely locked in erected positions. It should be further noted that the construction as herein disclosed is readily adapted to machine erection from the said knocked-down blank.

What is claimed is:

1. A carton or container comprising a rectangular main panel, side walls upstanding from two opposed edges of the main panel each including an inner and an outer wall member, said outer wall members each having a slit therein adjacent a similar end thereof, said slits each having a central portion upwardly of and parallel with the bottom panel and end portions parallel with and below the central portion at the bottom of its side wall to provide shoulders at the ends of each slit, an end wall including an outer wall member and a top wall member with said top wall member disposed on the upper edges of the ends of the side walls immediately adjacent the said end wall outer wall member, a locking flap integrally, hingedly, connected with and depending from each end of the top wall member to depend exteriorly of said ends of the side walls, locking lugs integrally hingedly connected with the major portion of the locking flaps for locking insertion within the side walls slits, said locking lugs having shoulders at the ends of their hinge connections for engagement behind the locking shoulders at the locking slits ends, a second end wall comprising inner and outer wall members, and means associated with said second end wall for locking same in erected position, comprising tucking flaps from the ends of the side walls to be embraced by the said second end wall inner and outer wall members, and cooperating locking lugs and shoulders on said second end wall inner wall member and adjacent ends of the side walls.

2. A carton or container comprising a main panel, side walls extending from two opposed edges of said main panel each comprising an outer wall member, an inner wall member and a top wall member spacing said inner and outer wall members from one another, means carried by said side walls inner wall members for securing same in spaced relation to the outer wall member as determined by the width of the top wall member, said side walls outer wall members each having a slit therein adjacent a similar end thereof with said slits each having a central portion upwardly of and parallel with the bottom panel and end portions parallel with and below the central portion at the bottom of its side wall to provide shoulders at the ends of each slit, an end wall upstanding from each of the remaining edges of the main panel, each wall including an outer wall member and a top wall member, said end walls outer wall members and top wall members being of a length equal to the width of the main panel and with the end walls top wall members disposed on the adjacent ends of the side walls top wall members, a locking flap integrally, hingedly, connected with each end of each end wall top wall member to depend exteriorly of the side wall outer wall member adjacent end to have the lower end of each locking flap in the plane of the main panel, a locking lug integrally, hingedly, connected with the major portion of the lower end of each locking flap for locking insertion with the locking slits in the side walls outer wall members, said locking lugs each having a locking shoulder at the ends of its hinge connection with said locking shoulders engaged behind the locking shoulders at the locking slits ends, an end wall inner wall member depending from each end wall top wall member and of a length to be disposed between the side walls inner wall members, and means for locking the said end and side walls inner wall members in operative positions.

3. A carton or container comprising a main panel, side walls extending from two opposed edges of said main panel each comprising an outer wall member, an inner wall member and a top wall member spacing said inner and outer wall members from one another, means carried by said side walls inner wall members for securing same in spaced relation to the outer wall member as determined by the width of the top wall member, said side walls outer wall members each having a slit therein adjacent a similar end thereof with said slits each having a central portion upwardly of and parallel with the bottom panel and end portions parallel with and below the central portion at the bottom of its side wall to provide shoulders at the ends of each slit, an end wall upstanding from each of the remaining edges of the main panel, each wall including an outer wall member and a top wall member, said end walls outer wall members and top wall members being of a length equal to the width of the main panel and with the end walls top wall members disposed on the adjacent ends of the side walls top wall members, a locking flap integrally, hingedly, connected with each end of each end wall top wall member to depend exteriorly of the side wall outer wall members adjacent end to have the lower end of each locking flap in the plane of the main panel, a locking lug integrally, hingedly, connected with the major portion of the lower end of each locking flap for locking insertion with the locking slits in the side walls outer wall members, said locking lugs each having a locking shoulder at the ends of its hinge connection with said locking shoulders engaged behind the locking shoulders at the locking slits ends, an end wall inner wall member depending from the end wall top wall member and of a length to be disposed between the side walls inner wall members, a locking slit in each of said side walls inner wall members inwardly of the ends thereof an amount equal to the width of the end walls top wall members, and locking lugs on the ends of the end walls inner wall members received in said side walls inner wall members locking slits locking the said end and side walls inner wall members in operative positions.

4. A carton or container comprising a main panel, side walls extending from two opposed edges of said main panel each comprising an outer wall member, an inner wall member and a top wall member spacing said inner and outer wall members from one another, means carried by said side walls inner wall members for securing same in spaced relation to the outer wall member as determined by the width of the top wall member, said side walls outer wall members each having a slit therein adjacent a similar end thereof with said slits each having a central portion upwardly of and parallel with the bottom panel and end portions parallel with and below the central portion at the bottom of its side wall to provide shoulders at the ends of each slit, an end wall upstanding from each of the remaining edges of the main panel, the first end wall including an outer wall member and a top wall member, said end walls outer wall member and top wall member being of a length equal to the width of the main panel and with the end wall top wall member disposed on the adjacent ends of the side walls top wall members, a locking flap integrally, hingedly, connected with each end of the top wall member to depend exteriorly of the side walls outer wall members adjacent ends to have the lower end of each locking flap in the plane of the main panel, a locking lug integrally hingedly connected with the major portion of the lower end of each locking flap for locking insertion with the locking slits in the side walls outer wall members, said locking lugs each having a locking shoulder at the ends of its hinge connection with said locking shoulders engaged behind the locking shoulders at the locking slits ends, a second end wall comprising an inner and an outer wall member, tucking flaps from the adjacent ends of the side walls adapted to be enfolded by the said second end walls inner and outer wall members, and locking lugs from the ends of said second end wall inner wall member engaging the adjacent ends of the side walls inner wall members for locking the said second end wall in erected position.

References Cited in the file of this patent

UNITED STATES PATENTS

| 1,114,040 | Richardson | Oct. 20, 1914 |
| 2,283,950 | Ringler | May 26, 1942 |
| 2,307,720 | Ringler | Jan. 5, 1943 |
| 2,319,018 | Ullman | May 11, 1943 |
| 2,481,288 | Cage | Sept. 6, 1949 |
| 2,628,012 | Goldsholl | Feb. 10, 1953 |
| 2,645,353 | Anderson | July 14, 1953 |

FOREIGN PATENTS

| 466,642 | Italy | Nov. 7, 1951 |